(12) United States Patent
Nishino et al.

(10) Patent No.: US 9,184,662 B2
(45) Date of Patent: Nov. 10, 2015

(54) ELECTRIC POWER SUPPLY APPARATUS

(75) Inventors: Hiroyuki Nishino, Osaka (JP); Kazunori Kidera, Osaka (JP); Mariko Nishi, Shiga (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 306 days.

(21) Appl. No.: 13/823,339

(22) PCT Filed: Sep. 21, 2011

(86) PCT No.: PCT/JP2011/071420
§ 371 (c)(1),
(2), (4) Date: Mar. 14, 2013

(87) PCT Pub. No.: WO2012/053307
PCT Pub. Date: Apr. 26, 2012

(65) Prior Publication Data
US 2013/0170252 A1 Jul. 4, 2013

(30) Foreign Application Priority Data

Oct. 19, 2010 (JP) .................................. 2010-234517

(51) Int. Cl.
*H02M 3/335* (2006.01)
*H02M 1/08* (2006.01)
*H02M 3/338* (2006.01)

(52) U.S. Cl.
CPC ............ *H02M 3/33507* (2013.01); *H02M 1/08* (2013.01); *H02M 3/335* (2013.01);
(Continued)

(58) Field of Classification Search
CPC .......... Y02B 70/1433; Y02B 70/1475; H02M 3/335; H02M 1/08

USPC .............. 363/21.02, 21.03, 21.04, 21.05, 17, 363/127; 323/239; 307/108, 43, 82
See application file for complete search history.

(56) References Cited

U.S. PATENT DOCUMENTS

2007/0263421 A1* 11/2007 Kyono ........................... 363/127
2008/0278985 A1* 11/2008 Ribarich ....................... 363/127
(Continued)

FOREIGN PATENT DOCUMENTS

| CN | 101154891 A | 4/2008 |
|---|---|---|
| JP | 08-228484 | 9/1996 |
| JP | 2009-148106 A | 12/2011 |

OTHER PUBLICATIONS

International Search Report for corresponding International Application No. PCT/JP2011/071420 mailed Dec. 27, 2011.
(Continued)

*Primary Examiner* — Jue Zhang
*Assistant Examiner* — Trinh Dang
(74) *Attorney, Agent, or Firm* — Renner, Otto, Boisselle & Sklar, LLP

(57) ABSTRACT

An electric power supply apparatus, which enables a driving frequency of a switching circuit connected to a primary side of a transformer constant and output of a secondary side variable, comprises a transformer (5), a series circuit of two first switching elements (Q1, Q2) connected between terminals of a direct current power supply (2), an LC resonant circuit connected between both ends of one of the first switch element (Q2) and a primary winding (Np) of the transformer (5), bidirectional switch elements (Q3, Q4) connected to secondary windings (Ns1, Ns2) of the transformer (5) and having a rectification function and a phase control function, and a control circuit for inputting gate driving signals having a phase difference into the first switch elements (Q1, Q2) and the second switch elements (Q3, Q4).

11 Claims, 13 Drawing Sheets

(52) U.S. Cl.
CPC ........ *H02M3/3382* (2013.01); *H02M 3/33592* (2013.01); *Y02B 70/1433* (2013.01); *Y02B 70/1475* (2013.01)

(56) References Cited

U.S. PATENT DOCUMENTS

2010/0052423 A1* 3/2010 Shimada et al. ............. 307/43
2010/0135053 A1 6/2010 Morimoto et al.
2010/0177536 A1* 7/2010 Liu ............................. 363/17

OTHER PUBLICATIONS

Yatsuri et al., "Phase Control Half Bridge Resonant Converter with Secondary Switches", IEICE Tech. Rep, vol. 108, No. 150, EE2008-13, pp. 7-11, Jul. 2008 with English abstract (cited in the specification).

* cited by examiner (a)

(b)

ELECTRIC POWER SUPPLY APPARATUS

TECHNICAL FIELD

The present invention relates to a variable output type electric power supply apparatus comprising a multi-resonant type half bridge converter.

BACKGROUND ART

FIG. 14 shows basic constitution of a variable output type electric power supply apparatus 50 comprising a multi-resonant type half bridge converter (an LLC converter). In addition, FIG. 15 shows waveforms such as signals in each part of the electric power supply apparatus 50. As shown in FIG. 14, in the electric power-supply apparatus 50, a multi-resonant type half bridge converter (a switching circuit), which is constituted by two switch elements Q51 and Q52 and so on, is connected to a primary winding Np50 side of a transformer 51. In addition, diodes D53 and D54 for rectification are respectively connected to secondary windings Ns51, Ns52 sides of the transformer 51.

As shown in FIG. 15, driving signals Vg51 and Vg52 are alternately inputted to gates of the switch elements Q51 and Q52 with intervening a dead-off time (a time period during which both of the switch elements Q51 and Q52 are turned off), so that an alternating current flows in the primary winding Np50. Hereupon, a voltage across a condenser Ci is assumed as VCi. Since a resonant circuit, which is constituted by an inductor Lr and capacitors Cv and Ci, is connected to the primary winding Np50 of the transformer 51, an electric current which flows to the primary winding Np50 through the switch elements Q51 and Q52 has a waveform similar to those of IQ51 and IQ52. Attending to the waveforms of such electric currents IQ51 and IQ52, values of the electric currents are rarely varied during the time period ΔT, so that it can be regarded as a direct electric current. Therefore, electric currents rarely flow to the secondary windings Ns51 and Ns52 of the transformer 51 during the time period ΔT, so that electric currents flowing to diodes D53 and D54 have intermittent waveforms like ID 53 and ID 54. The time period ΔT is called "electric power non-transmission time period".

Hereupon, a voltage of a direct current electric power supply 52, that is, an input voltage $V_{IN}$ and a voltage applied to a load 53 from the secondary windings Ns1 and Ns2 of the transformer 51 through the diodes D53 and D54, that is, an output voltage $V_{out}$ are expressed as follows. Besides, "n" designates a turn ratio (step down) of the transformer 51, "Lp" designates an excitation inductance of the transformer 51, "Lr" designates a leakage inductance of the transformer 51, "C" designates a capacity of a capacitor for resonance which is connected in a series connection, and "ΔT" designates the electric power non-transmission time period.

$$V_{OUT} = \frac{V_{IN}}{n} \cdot \frac{1}{2 - \frac{\Delta \cdot \pi}{2 \cdot Lp}\sqrt{\frac{C}{Lr}}} \quad \text{[FORMULA 1]}$$

Hereupon, when the electric power non-transmission time period ΔT is lengthened, the output voltage $V_{OUT}$ rises, and when the electric power non-transmission time period ΔT is shortened, the output voltage $V_{OUT}$ lowers. Therefore, it is possible to vary the output voltage from this electric power supply apparatus 50 by controlling the electric power non-transmission time period ΔT. In order to control the electric power non-transmission time period ΔT, timings for switching on/off of the driving signals Vg51 and Vg52 applied to the gates of the switch elements Q51 and Q52, that is, a frequency (or cycle) of pulse signals should be varied.

This electric power supply apparatus 50 is used as a switching electric power supply of various electric apparatuses because it can control the output voltage in high efficiency while being a relatively simple circuitry. However, in order to control the output voltage extensively, it is necessary to vary the frequency of the above pulse signals largely, but there is a controllable limit ΔT=0 for the electric power non-transmission time period. In addition, when the dead-off time is shortened, the switch elements Q51 and Q52 become very likely to be switched on simultaneously. Consequently, the electric current flowing to the load 53 does not become zero, and thus, a condition of zero-voltage switch collapses and soft-switching may not be realized.

FIG. 16 a constitution of an electric power supply apparatus 50' comprising a multi-resonant type half bridge converter to control the output voltage in a wider range, which is suggested in a prior art document 1, for example. FIG. 17 shows waveforms such as signals in each part of the electric power supply apparatus 50'. As shown in FIG. 16, switch elements Q53 and Q54 are connected in series with diodes D53 and D54 in a secondary side of a transformer 51. This electric power supply apparatus 50' performs phase control by the switch elements Q53 and Q54 connected to the secondary side of the transformer 51. In FIG. 17, Vg51-Vg54 respectively show waveforms and timings of driving signals inputted into gates of the switch elements Q51-Q54. In addition, VQ51-VQ54 respectively show voltages of the switch elements Q51-Q54. As for the switch elements Q51-Q54, switch elements such as MOSFETs are assumed, for example, and the MOSFET has a parasitism diode and a parasitism capacity. Besides, the driving signals Vg51-Vg54 respectively correspond to driving signals Vg1, Vg2, Vg3a and Vg4a which will be mentioned later.

In this electric power supply apparatus 50', it is assumed that a driving frequency of a switching circuit in a primary side of the transformer 51 is constant, and timings for on/off of the switch elements Q53 and Q54 are delayed to timings for on/off of the switch elements Q51 and Q52 in the primary side. Since a duty ratio of voltage waveforms generated in the secondary side of the transformer varies responding to a quantity of the delay of the timings, output control can be performed extensively.

In addition, since the driving frequency of the switching circuit in the primary side of the transformer 51 of the electric power supply apparatus 50' shown in FIG. 16 is constant, electric power loss due to the switching circuit rarely increases in comparison with the electric power supply apparatus 50 shown in FIG. 14. However, in the electric power supply apparatus 50', electric power losses due to the switch elements Q53 and Q54 connected to the diodes D53 and D54 for rectification in the secondary side of the transformer 51 increase. In particular, the electric power losses due to the switch elements Q53 and Q54 are the same level as the electric power losses due to the diodes D53 and D54 for rectification, so that the electric power losses in the secondary side become double, simply.

PRIOR ART DOCUMENT

Non-Patent Document

NON-PATENT DOCUMENT 1: Shigenori Yatsuri, Koji Fujiwara, Ypshiyuki Ishihara and Toshiyuki Todaka, "Phase Control half Bridge Resonant Converter with Secondary Switches." IEICE Tech. Rep., vol. 108, no. 150, EE2008-13, pp. 7-11, July 2008.

SUMMARY OF THE INVENTION

The present invention is aimed to provide a variable output type electric power supply apparatus comprising a multi-resonant type half bridge converter, which enables to fix a driving frequency of a switching circuit connected to a primary side of a transformer to be constant, and to reduce or not to increase electric power losses due to a rectifying circuit in a secondary side.

A variable output type electric power supply apparatus comprising a multi-resonant type half bridge converter in accordance with an aspect of the present invention comprises a transformer, a series circuit of two of first switch elements connected between terminals of a direct current electric power supply, an LC resonant circuit connected between both terminals of one of the first switch elements and a primary winding of the transformer, bidirectional second switch elements connected to secondary windings of the transformer and having rectification function and phase control function, and a control circuit inputting gate driving signals each having phase differences to the first switch elements and the second switch elements.

According to such a constitution, in the electric power supply apparatus comprising the multi-resonant type half bridge converter, the series circuits of the rectification diode and the MOSFETs which are to be provided in the secondary side of the transformer (see FIG. 16) are replaced by the bidirectional switch elements each having two gates. Therefore, it is possible to reduce a number of elements in the secondary side of the transformer and to reduce the electric power losses due to the switch elements, in comparison with conventional one.

MODE FOR CARRYING OUT THE INVENTION

Figure 1:
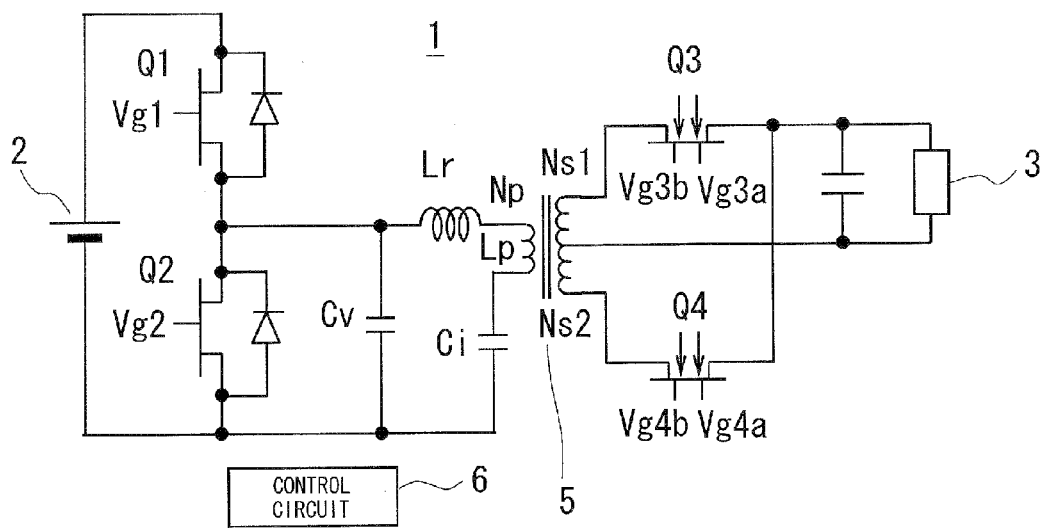
FIG. 1 is a drawing showing a constitution of variable output type electric power supply apparatus comprising a multi-resonant type half bridge converter in accordance with an embodiment of the present invention.
Figure 16:
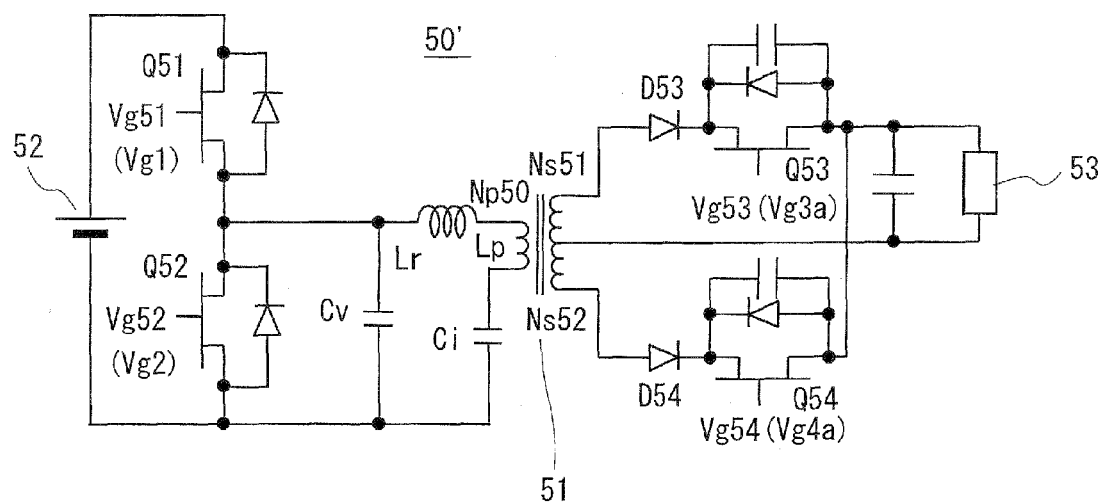
FIG. 16 is a drawing showing a constitution of another conventional in each part of the electric power supply apparatus
Figure 17:
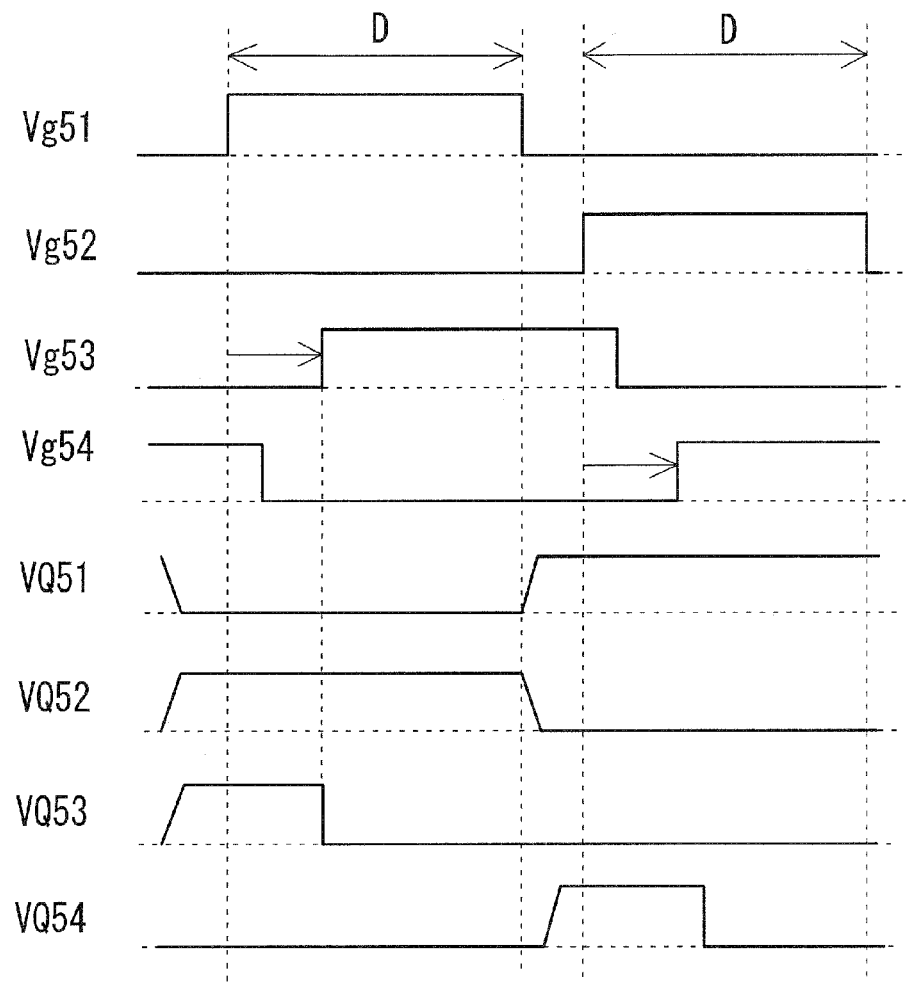
FIG. 17 is a drawing showing waveforms in each part of the electric power supply apparatus shown in FIG. 16.

A variable output type electric power supply apparatus comprising a multi-resonant type half bridge converter in accordance with an embodiment of the present invention is described. FIG. 1 shows a constitution of an electric power supply apparatus 1 in accordance with this embodiment. In the electric power supply apparatus 1, a multi-resonant type half bridge converter (switching circuit), which is constituted by two of first switch elements Q1 and Q2 such as MOSFETs, is connected to a primary winding Np side of a transformer 5. A direct current electric power supply 2 is connected to this switching circuit. On the other hand, second switch elements Q3 and Q4 are respectively connected to secondary windings Ns sides of the transformer 5. The second switch element Q3 serves as the diode D53 and the switch element Q53 in the prior art shown in FIG. 16, so that an effect similar to the synchronous rectification can be accomplished. In addition, the second switch element Q4 serves as the diode D54 and the switch element Q54. Therefore, dual-gate type switch elements having two gates are used for the second switch elements Q3 and Q4.

Phase control signals, which are in synchronism with gate signals Vg1 and vg2 for the first switch elements Q1 and Q2, are inputted into one of the gates (first gate) of each of the second switch elements Q3 and Q4, and the other gate (second gate) is controlled to accomplish an effect equivalent to the synchronous rectification. A load 3 is connected to the second switch elements Q3 and Q4. Besides, the second switch elements Q3 and Q4 are the switch elements having no parasitism diode, which will be mentioned later. In addition, since the second switch elements Q3 and Q4 respectively have two gates, they are called "dual-gate type switch elements".

Figure 3:
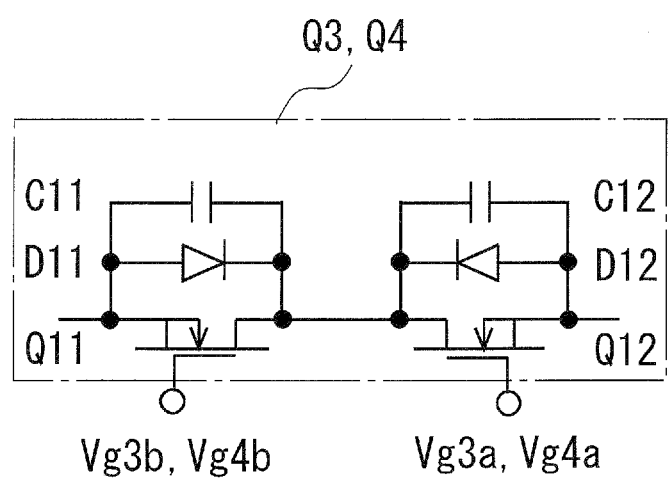
FIG. 3 is a drawing showing an equivalent circuit of the above bidirectional switch.
Figure 4:
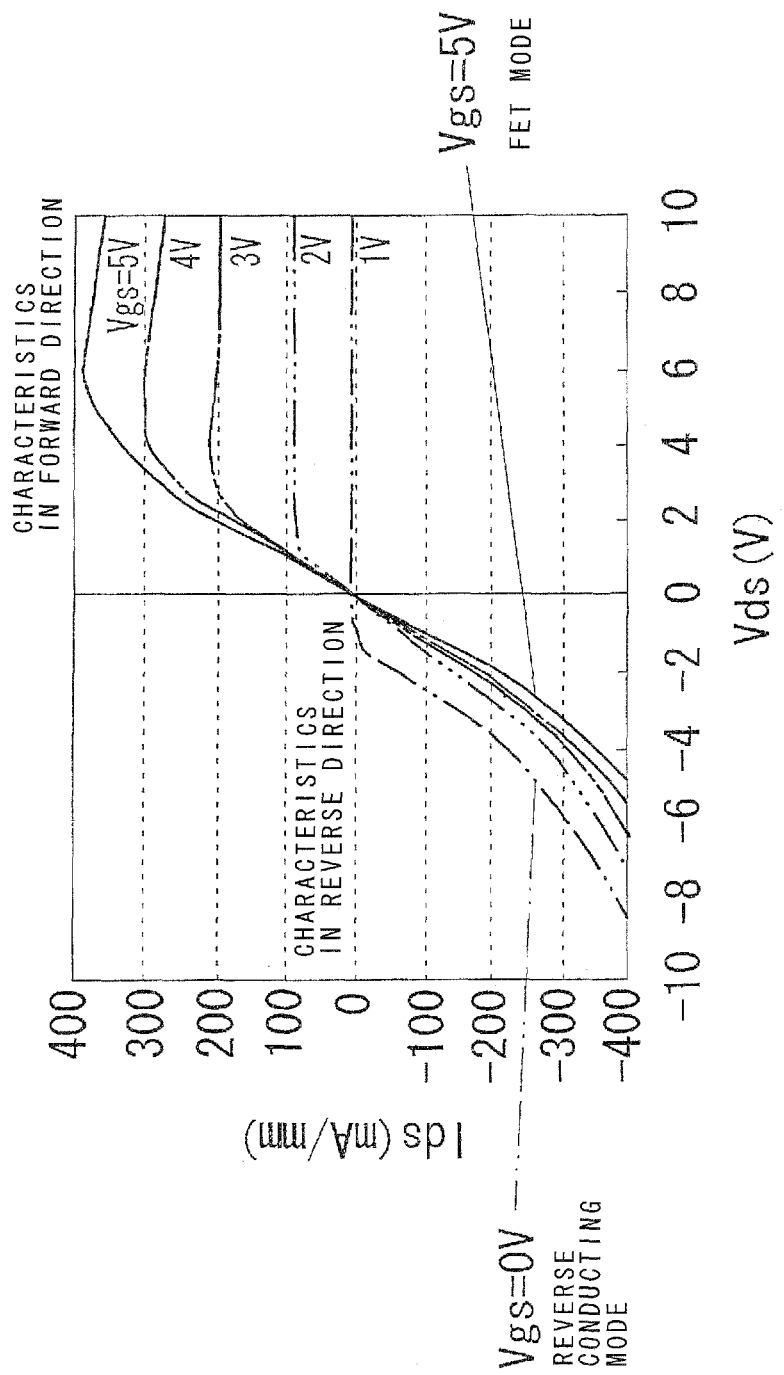
FIG. 4 is a drawing showing voltage•electric current characteristics of the bidirectional switch element shown in FIG. 3.

An equivalent circuit of the second switch elements Q3 and Q4 is shown in FIG. 3. The second switch elements Q3 and Q4 have a constitution that two MOSFETs Q11 and Q12 are connected in a manner so that directions of parasitism diodes D11 and D12 are reversed (in the equivalent circuit). Although there are no parasitism diodes D11 and D12 structurally, in the reverse direction characteristics similar to the diodes are accomplished, regardless of gate biases. In addition, references C11 and C12 show parasitism capacitances. FIG. 4 shows voltage•electric current characteristics of a circuit that a companion is taken from the equivalent circuit of the bidirectional switch elements Q2 and Q3 shown in FIG. 3. When assuming the gate voltage as Vgs and it is applied as a forward bias, a forward direction characteristic of this switch element shows a transistor characteristic, and a reverse direction characteristic thereof shows a diode characteristic, regardless of the gate bias. In addition, the above diode characteristic shows a tendency that the higher the voltage of the forward bias of the gate, the above diode characteristic shifts to right side much more in the figure. Consequently, on-voltage falls, and an effect as close as the synchronous rectification is accomplished.

Figure 5:
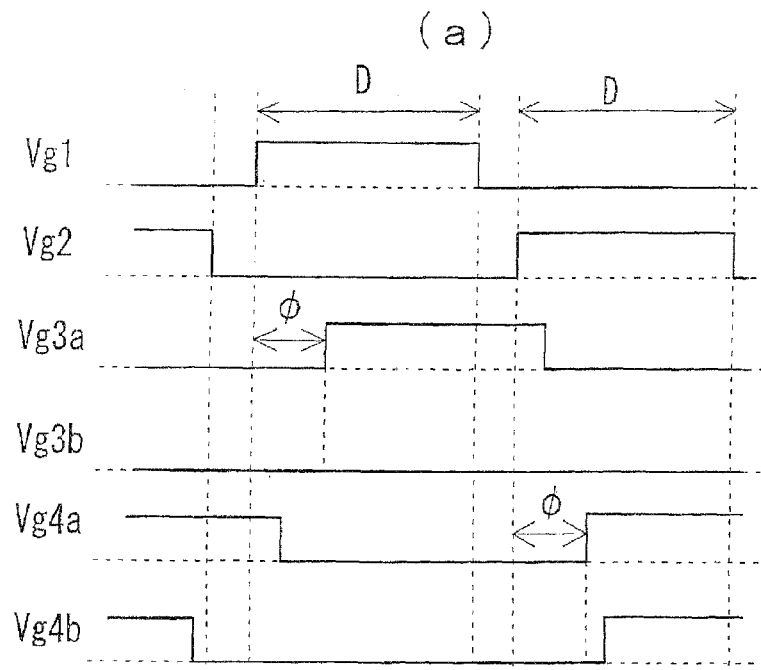
FIG. 5 is a drawing showing waveforms of driving signals inputted into each switch element of the above electric power supply apparatus, and wherein (a) is a waveform chart in case of utilizing diode characteristics, and (b) is a waveform chart in case of having similar functions to synchronous rectification.
Figure 5:
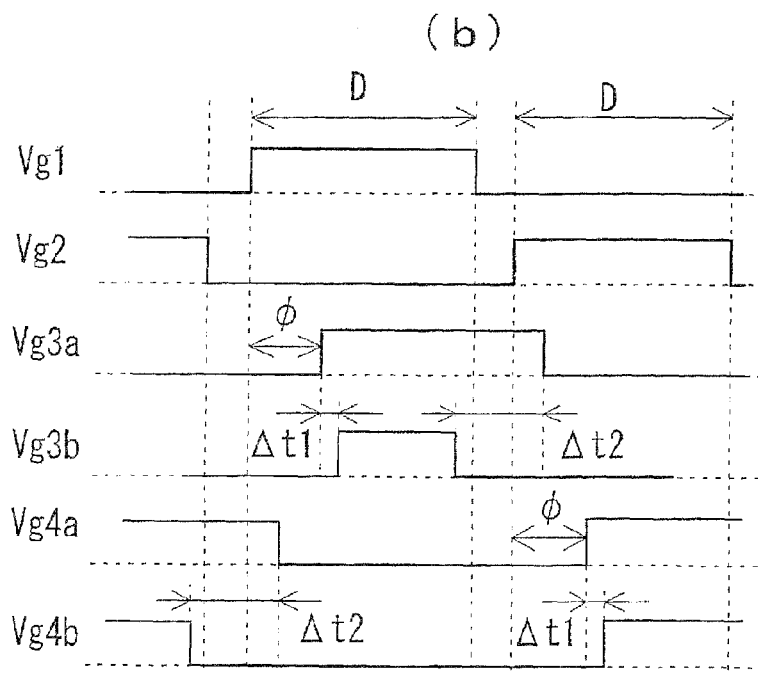
Figure 15:
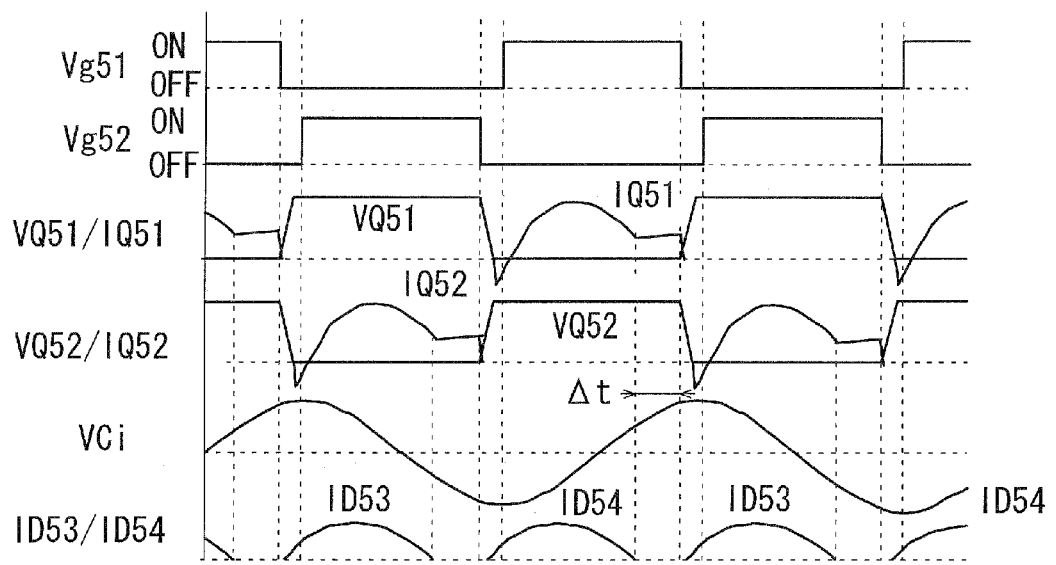
FIG. 15 is a drawing showing waveforms in each part of the electric power supply apparatus shown in FIG. 14.

Driving signals Vg1, Vg2, Vg3a, Vg3b, Vg4a, Vg4b shown in FIGS. 5(a) and 5(b) are inputted into the first switch elements Q1 and Q2 and the second switch elements Q3 and Q4, respectively. FIG. 5(a) shows an example utilizing a diode characteristic which is accomplished by maintaining a Low level with giving no bias to the second gates of the second switch elements Q3 and Q4. As shown in FIG. 4, although the on-voltage Vf is high for the diode characteristic, it needs no biasing circuit, it enables to simplify the circuit constitution. In addition, FIG. 5(b) shows an example to accomplish an effect similar to the synchronous rectification is performed by adding biases to the second gates of the second switch elements Q3 and Q4 during a time period serving as the diodes so as to decrease the on-voltage Vf. In FIG. 5 (b), the driving signals Vg3a and Vg4a are the phase control signals (first gate driving signals) which are in synchronism with the gate signals Vg1a and Vg2a of the first switch elements Q1 and Q2, and the driving signals Vg3b and Vg4b are the driving signals for the synchronous rectification (second gate driving signals). The driving signals Vg1 and Vg2 have the same waveforms and alternately outputted interleaving a dead off time similar to the prior art shown in FIG. 15. Thereby, the first switch elements Q1 and Q2 are alternately switched on/off, and an alternating current flows in the primary winding Np of the transformer 5. Basically, these driving signals Vg1, Vg2, Vg3a, Vg3b, Vg4a, Vg4b are explained to be outputted from a control circuit 6, but these all may not be outputted from the control circuit 6, which will be mentioned later. In addition, when the gate driving circuit is insulated by a transformer, pulse signals having a predetermined frequency is inputted to a primary winding of the transformer so as to generate the driving signals Vg1, Vg2, Vg3a, Vg3b, Vg4a, Vg4b after rectification are generated in a secondary side of the transformer. Furthermore, wire connections between the control circuit 6 and the first switch elements Q1 and Q2 and the second switch elements Q3 and Q4 are omitted on the grounds of illustration.

On the other hand, the second switch elements Q3, Q4 are conducted while the first gate driving signals Vg3a and Vg4a for phase control are inputted. If the second gate driving signals Vg3b and Vg4b are not inputted in the time period, since the diode characteristic of the second switch elements Q3 and Q4 has high on-voltages, the electric power losses due to them will be increased, and thus, it is not advantageous by contrast the prior art although the constitutions are simple. Therefore, when inputting the second gate driving signals Vg3b and Vg4b temporarily during the first gate driving signals Vg3a and Vg4a are inputted, it is possible to decrease the electric power losses due to the diode characteristics by the effect similar to the synchronous rectification. If the time periods of the second gate driving signals Vg3b and Vg4b are set to be the same as the time periods of the first gate driving signals Vg3a and Vg4a, the electric power loss due to the parasitism diode D11 can be decreased maximum. However, when the synchronous rectification is performed, the gates are biased in forward direction, so that there is a fear that outputs will be short-circuited by conducting in the reverse direction, and thus, a time period during which an electric current in reverse direction flows surely exists in the time period of the first gate driving signals Vg3a and vg4a. Thus, in a time period during which flowing of an electric current in the reverse direction is anticipated, it is necessary to stop the synchronous rectification to turn back the original diode functions. Therefore, it is necessary to set a width of the second gate driving signals Vg3b and Vg4b shorter than a width of the first gate driving signals Vg3a and Vg4a.

It is possible to vary the output by varying a phase difference φ between the first gate driving signals Vg3a and Vg4a and the second gate driving signals Vg3b and Vg4b. In addition, it is possible to prevent a phenomenon of short-circuit in the secondary side due to the synchronous rectification by delaying the rising edges of the second gate driving signals Vg3b and Vg4b by Δt1 with respect to the rising edge of the first gate driving signals Vg3a and Vg4a and by advancing the falling edges of the second gate driving signals Vg3b and Vg4b by Δt2 with respect to the rising edge of the first gate driving signals Vg3a and Vg4a. Besides, it is assumed that the falling edges of the second gate driving signals Vg3b and Vg4b are advanced the falling edges of the driving signals Vg1 and Vg2.

Figure 2:
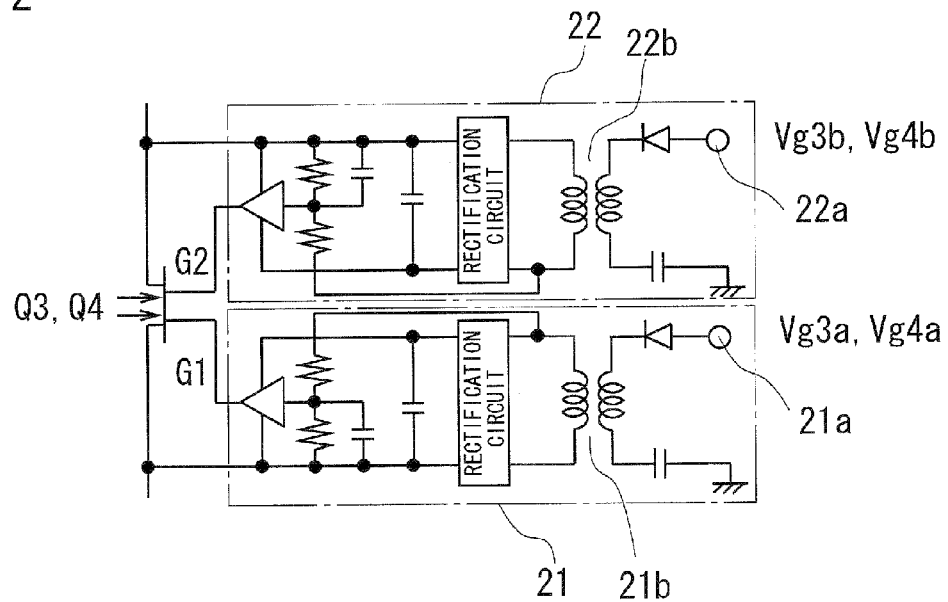
FIG. 2 is a drawing showing a constitution of a gate driving circuit for driving a bidirectional switch element in the above electric power supply apparatus.

FIG. 2 shows a structural example of a gate driving circuit for inputting the driving signals into two gates G1 and G2 of the second switch elements Q3 and Q4. In the structural example shown in FIG. 2, a first gate driving circuit 21 and a second gate driving circuit 22, which are independent from each other and have the same constitution, are respectively connected to the first gate G1 and the second gate G2 of the second switch element Q3 or Q4. In this case, the control circuit 6 inputs the above first gate driving signals Vg3a or Vg4a into an input terminal 21a of the first gate drive circuit 21 and inputs the above second driving signals Vg3b or Vg4b into an input terminal 22a of the second gate driving circuit 22. Besides, since the first gate driving circuit 21 and the second gate driving circuit 22 are respectively insulated by transformers 21b and 22b, sequence of pulse signals having a predetermined frequency which can generate these gate driving signals Vg3a-Vg4b are inputted, actually. In the following description, the sequence of pulse signals for generating the gate driving signals Vg3a-Vg4b is called "driving pulse signals" in order to be distinguished from the gate driving signals Vg3a-Vg4b.

Figure 6:
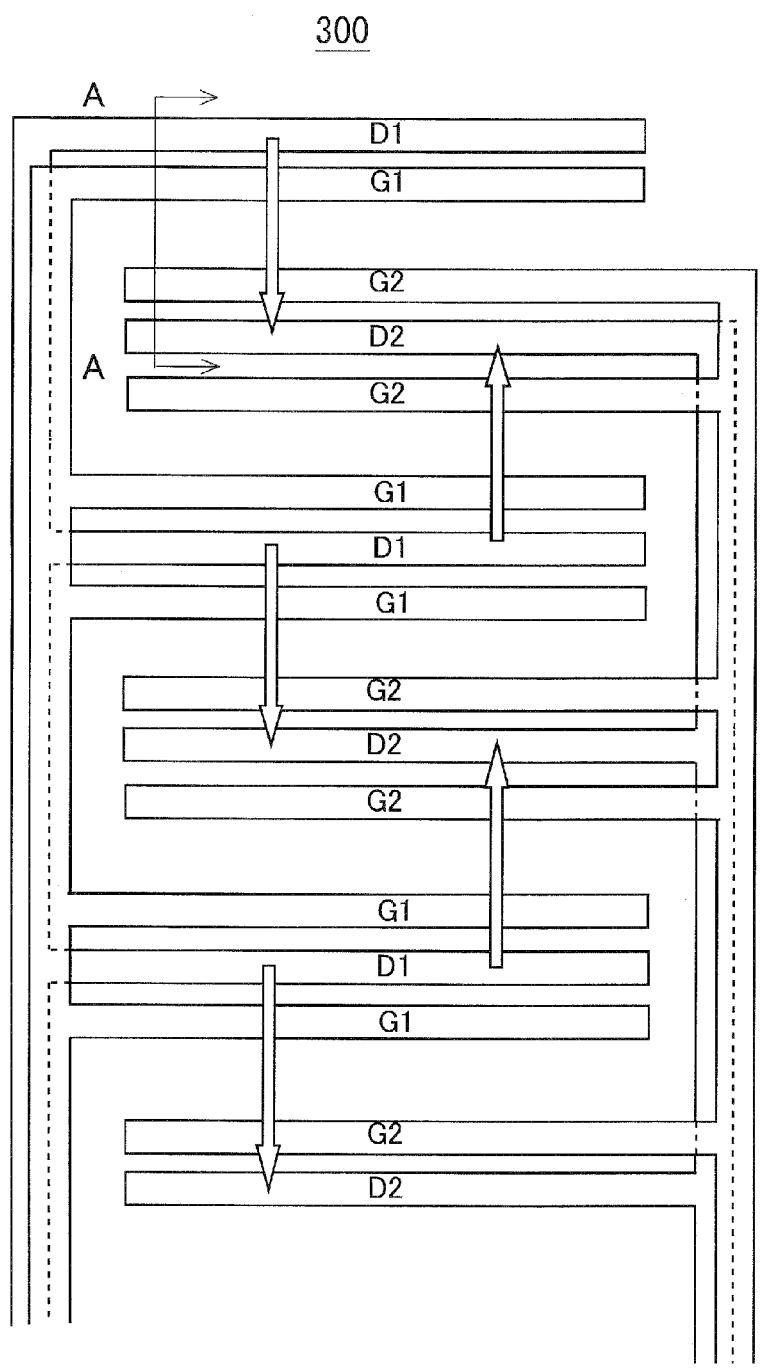
FIG. 6 is a plain view showing a constitution of a dual-gate type bidirectional switch element.
Figure 7:
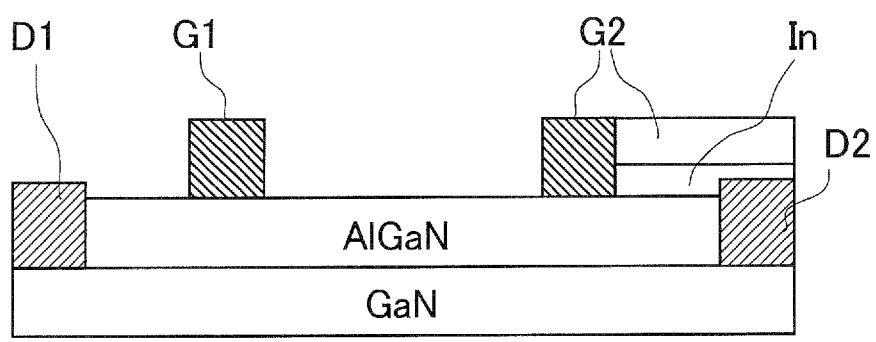
FIG. 7 is an A-A cross-sectional view in FIG. 6.

Subsequently, a concrete example of a switch element which is to be used for the second switch elements Q3 and Q4 is described. FIGS. 6 and 7 show a constitution of a bidirectional switch element 300 having a horizontal transistor structure using GaN/AlGaN. FIG. 6 is a plain view showing the constitution of the bidirectional switch element 300, and FIG. 7 is an A-A cross section. In addition, this bidirectional switch element 300 is called "dual-gate type" because two gates G1 and G2 are provided between two electrodes D1 and D2.

As shown in FIGS. 6 and 7, the bidirectional switch element 300 of the horizontal dual-gate transistor structure is a structure which realizes a bidirectional element of a few electric power loss having only one point at which a withstand voltage is to be maintained. That is, drain electrodes D1 and D2 are respectively formed to reach the GaN layer, and gate electrodes G1 and G2 are respectively formed on the AlGaN layer. In a condition that no electric voltage is applied to the gate electrodes G1, G2, an electronic blank zone occurs in a two-dimensional electron gas layer which is generated in an hetero-interface of AlGaN/GaN beneath the gate electrodes G1, G2, so that no electric current flows. On the other hand, when electric voltages are applied to the gate electrodes G1, G2, an electric current flows through the hetero-interface of AlGaN/GaN from the drain electrodes D1 to D2 (in vice versa). Although a gap between the gate electrodes G1 and G2 needs a withstand voltage so that it is necessary to provide a constant distance, but a gap between the drain electrode D1 and the gate electrode G1 and a gap between the drain electrode D2 and the gate electrode G2 need no withstand voltage. Therefore, the drain electrode D1 and the gate electrode G1, and the drain electrode D2 and the gate electrode G2 may be overlapped via an insulation layer In. In addition, an element of this constitution has to be controlled on the basis of the voltages of the drain electrodes D1, D2, so that it is necessary to input the drive signals into two of the gate electrodes G1, G2 each (therefore, it is called "dual-gate transistor structure"). The bidirectional switch element 300 having the horizontal transistor structure using this GaN/AlGaN has characteristics that conduction resistance is smaller and the electric power loss in conductive state of the switch element is much smaller in comparison with the MOSFET.

Figure 8:
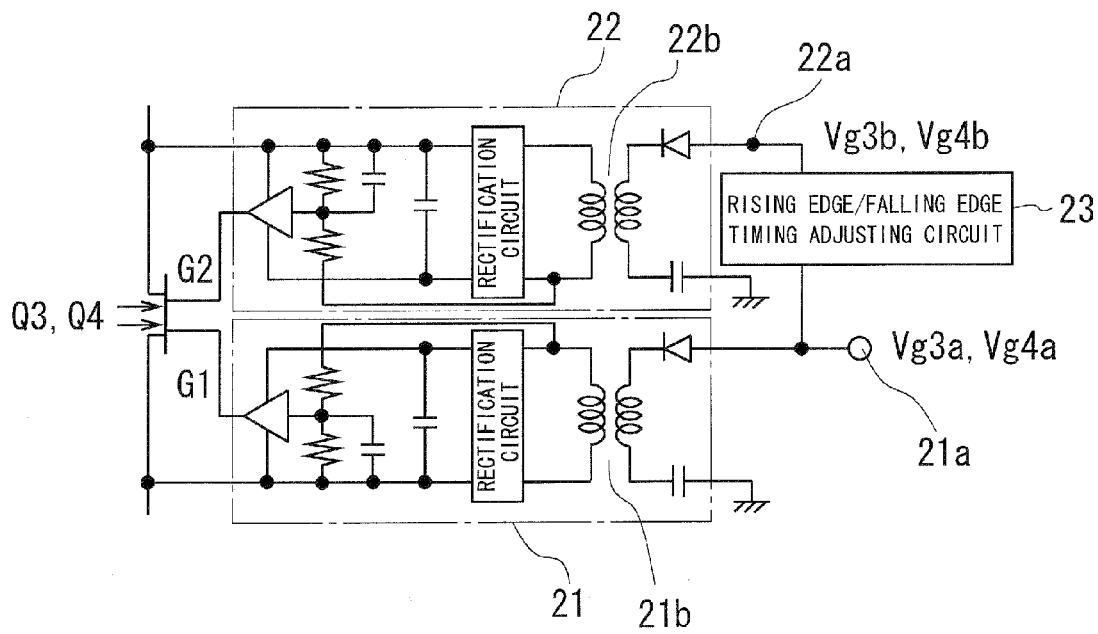
FIG. 8 is a drawing showing another constitution example of the gate driving circuit in the above embodiment.

FIG. 8 shows another structural example of the gate driving circuit. In the structural example shown in FIG. 8, a first gate driving circuit 21 and a second gate driving circuit 22, which are independent from each other and have the same constitution, are respectively connected to the first gate G1 and the second gate G2 of the second switch element Q3 or Q4, similar to the structural example shown in FIG. 2. However, an input terminal 22a of the second gate driving circuit 22 is connected to an input terminal 21a of the first gate driving circuit 21 via a rising edge/falling edge timing circuit (SIC) 23. In this case, the control circuit 6 inputs drive pulse signals for generating the above first driving signals Vg3a or Vg4a only to the input terminal 21a of the first gate drive circuit 21. Thereby, the first driving signals Vg3a or Vg4a are inputted into the first gate G1 of the second switch element Q3 or Q4. On the other hand, the above driving pulse signals delayed by the rising edge/falling edge timing adjusting circuit 23 are inputted into the input terminal 22a of the second gate drive circuit 22. Thereby, the second gate driving signals Vg3b or Vg4b that the rising edge/falling edge timings are adjusted to the first gate driving signals Vg3a or Vg4a are inputted into the second gate G2 of the second switch element Q3, Q4.

Figure 9:
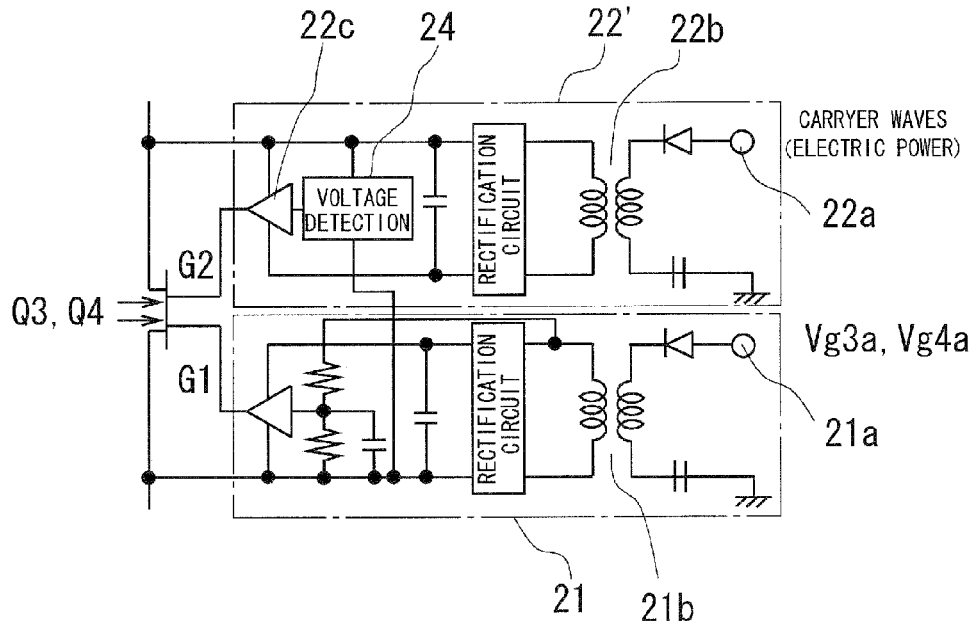
FIG. 9 is a drawing showing still another constitution example of the gate driving circuit in the above embodiment.

FIG. 9 shows still another structural example of the gate driving circuit. In the structural example shown in FIG. 9, a first gate driving circuit 21 and a second gate driving circuit 22' each having different constitution are respectively connected to the first gate G1 and the second gate G2 of the second switch element Q3 or Q4. The first gate driving circuit 21 has a constitution approximately the same as that of the first gate driving circuit 21 shown in the above FIG. 2 or FIG. 8. The control circuit 6 inputs drive pulse signals for generating the above first driving signals Vg3a or Vg4a into an input terminal 21a of the first gate driving circuit 21, only. Thereby, the first driving signals Vg3a or Vg4a are inputted into the first gate G1 of the second switch element Q3, Q4. On the other hand, the second gate driving circuit 22' comprises a voltage detection circuit 24 for detecting a voltage of the first gate driving signals Vg3a or Vg4a, and the control circuit 6 inputs carrier waves (electric power) that is a sequence of pulse signals having a predetermined frequency into an input terminal 22a of the gate driving circuit 22'. When the voltage detection circuit 24 detects that the voltage of the first gate driving signal Vg3a or Vg4a shows a predetermined voltage drop, it conducts a gate driver 22c. Thereby, the second gate driving signals Vg3b or Vg4b which is generated in a secondary side of a transformer 22b is inputted into the gate G2. A time which is needed to the above voltage drop corresponds to a sum of phase difference p and Δt1, and it is possible to set Δt2 practically resulting from high accuracy of the voltage detection circuit 24 for detecting the above voltage drop, too.

Figure 10:
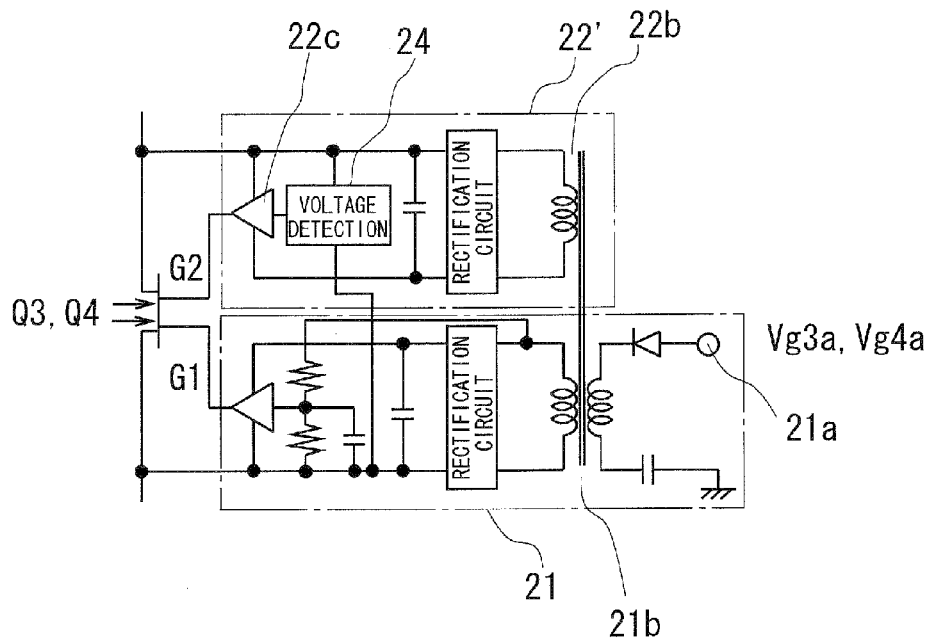
FIG. 10 is a drawing showing still another constitution example of the gate driving circuit in the above embodiment.

FIG. 10 shows a modified example of the gate driving circuit shown in FIG. 9. In the modified example shown in FIG. 10, primary sides of a transformer 21b of the first gate driving circuit 21 and a transformer 22b of the second gate driving circuit 22' are commonized. The control circuit 6 inputs the driving pulse signals for generating the above first driving signals Vg3a or Vg4a into the input terminal 21a of the first gate drive circuit 21, only. Thereby, the first driving signals Vg3a or Vg4a are inputted into the first gate G1 of the second switch element Q3 or Q4. In addition, when the voltage detection circuit 24 detects that the voltage of the first gate driving signal Vg3a or Vg4a shows the predetermined voltage drop, output of the gate driver 22 becomes in a high level. Thereby, the second gate driving signals Vg3b or Vg4b which are generated in the secondary side of the transformer 22b of the second gate driving circuit 22' are inputted into the second gate G2. In this case, the control circuit 6 has no need to input the carrier waves (electric power) of pulse signals of a predetermined frequency to the second gate driving circuit 22'.

Figure 11:
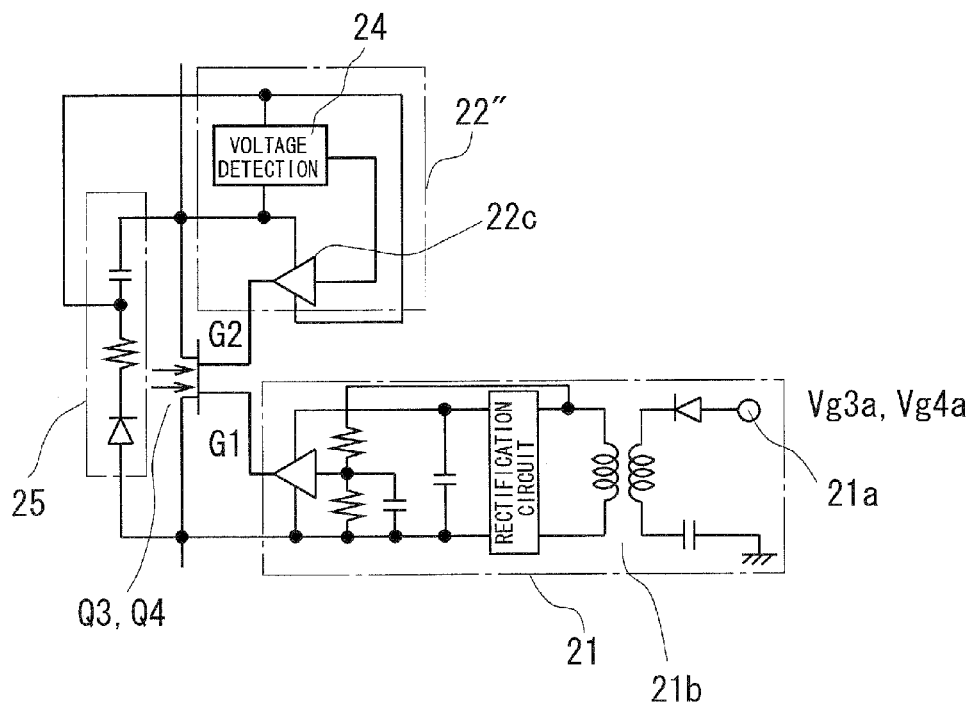
FIG. 11 is a drawing showing still another constitution example of the gate driving circuit in the above embodiment.

FIG. 11 shows a still another structural example of the gate driving circuit. In the structural example shown in FIG. 11, a snubber circuit 25 which consisted by a capacitor, a resistor and a diode is connected between terminals of the second switch element Q3 or Q4. A first gate driving circuit 21 similar to the above examples is connected to a first gate G1 of the second switch element Q3, Q4. The control circuit 6 inputs drive pulse signals for generating the above first driving signals Vg3a or Vg4a into an input terminal 21a of the first gate driving circuit 21, only. Thereby, the first driving signals Vg3a or Vg4a are inputted into the first gate G1 of the second switch element Q3 or Q4. A second gate driving circuit 22" for which generates driving signals for synchronization using an electric power obtained from the snubber circuit 25 is connected to the second gate G2 of the second switch elements Q3 or Q4. The second gate driving circuit 22" comprises a voltage detection circuit 24 for detecting a voltage of the first gate driving signal Vg3a or Vg4a. When the voltage detection circuit 24 detects a predetermined voltage drop of the voltage of the first gate driving signal Vg3a or Vg4a, output of a gate driver 22c becomes in a high level, and second driving signals for synchronization are inputted into the second gate G2 using the electric power obtained from the snubber circuit 25.

Figure 12:
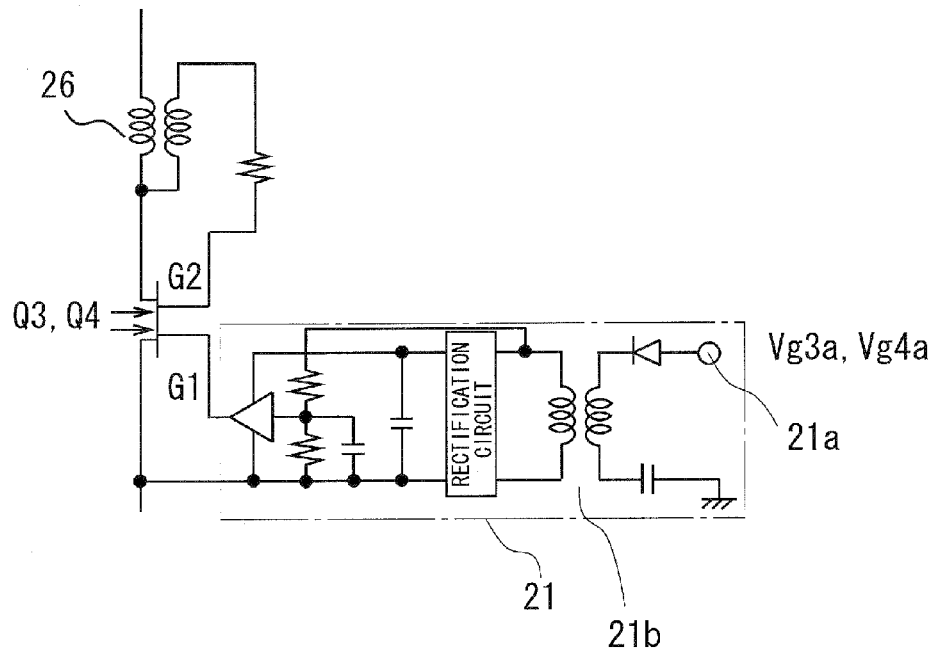
FIG. 12 is a drawing showing still another constitution example of the gate driving circuit in the above embodiment.

FIG. 12 shows another structural example of the gate driving circuit. In the structural example shown in FIG. 12, a primary winding of a transformer 26 is connected in series with the second switch element Q3 or Q4, and a secondary winding of the transformer 26 is connected to the second gate G2 of the second switch element Q3 or Q4. In addition, a (first) gate driving circuit 21 similar to the above structural examples is connected to the first gate G1 of the second switch element Q3, Q4. The control circuit 6 inputs driving pulse signals for generating the above first gate driving signals Vg3a or Vg4a into an input terminal 21a of the gate drive circuit 21, only. Thereby, the first driving signals Vg3a or Vg4a are inputted into the first gate G1 of the second switch element Q3 or Q4. In this case, second gate driving signals for synchronization is directly generated and inputted by electric currents flowing in the transformer 26 which is connected to the secondary side of the electric power supply apparatus 1.

Figure 13:
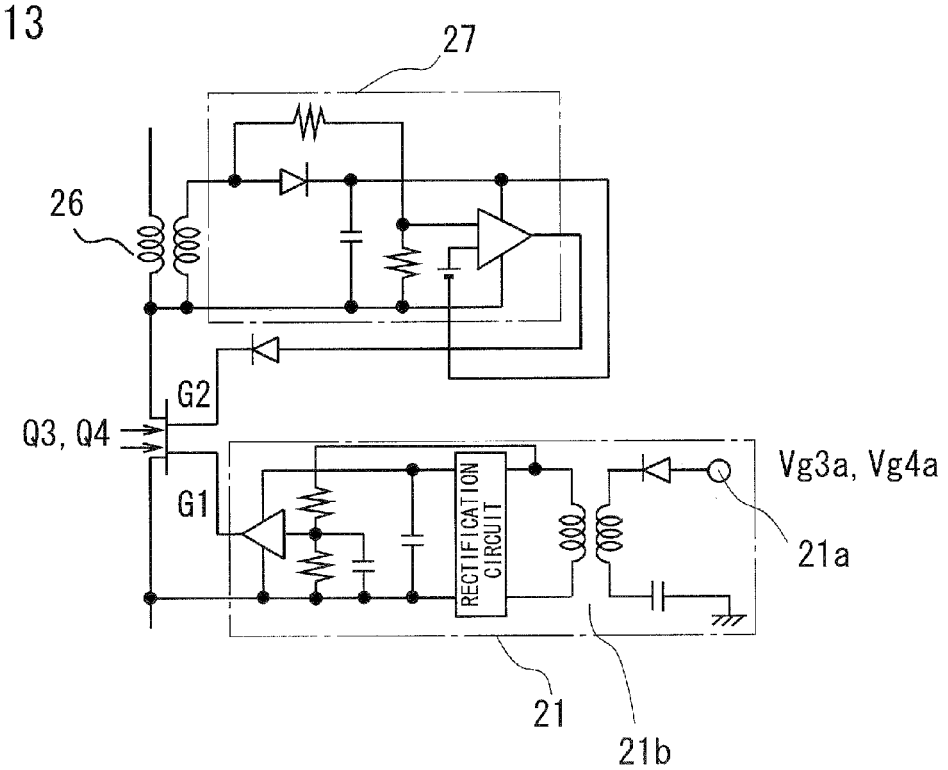
FIG. 13 is a drawing showing a modified example of the gate driving circuit shown in FIG. 12.
Figure 14:
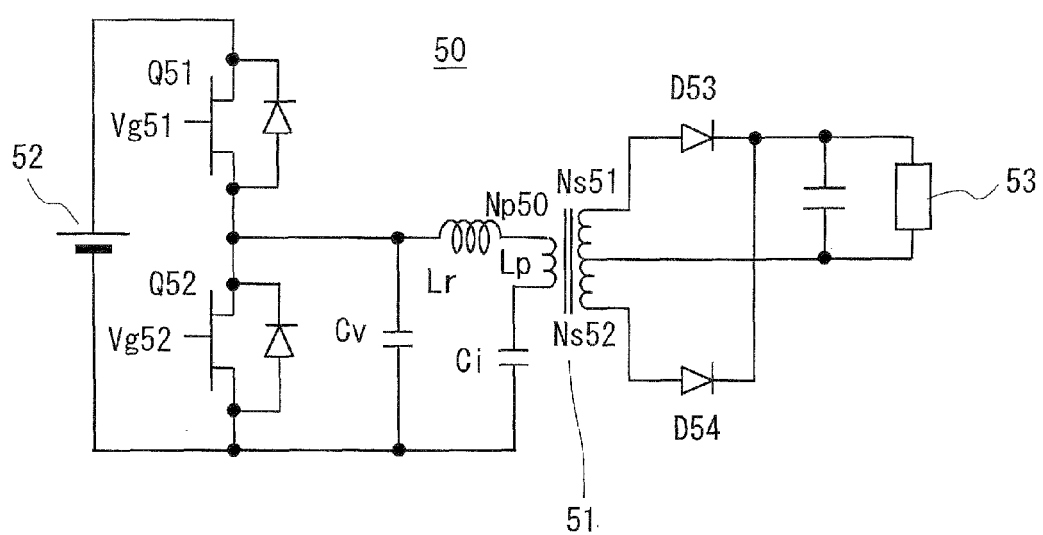
FIG. 14 is a drawing showing a basic constitution of a conventional variable output type electric power supply apparatus.

FIG. 13 shows a modified example of the gate driving circuit shown in FIG. 12. In the modified example shown in FIG. 13, a waveform forming circuit 27 is connected between the transformer 26 and the second gate G2 of the second switch element Q3 or Q4. In the structural example shown in FIG. 12, the waveform of the second gate driving signals which are inputted into the second gate G2 of the second switch element Q3 or Q4 becomes is in a substantially arc shape or in a substantially oval arc shape, however, in the modified example shown in FIG. 13, the waveform of the second gate driving signals can be made in a rectangular shape.

As mentioned above, according to the present invention, in the electric power supply apparatus comprising the multi-resonant type half bridge converter, the series circuits of the rectification diode and the MOSFET provided in the secondary side of the transformer (see FIG. 16) is replaced by the bidirectional switch elements having two gates. Therefore, a number of elements in the secondary side of the transformer can be reduced and the electric power losses due to the switch elements can be reduced in comparison with the conventional one. In addition, the first gate driving signals which are inputted into the first gate is variably driven with the phase difference $\phi$ with respect to the driving signals of the switch elements constituting the bridge circuit, and the second gate driving signals which are inputted into the second gate are risen at timings later than and fallen at timings earlier than those of the first gate signals inputted into the first gate. Therefore, a stable synchronous rectification function can be accomplished. In addition, since the converter can be driven at a constant frequency even when the output is varied, a soft switching condition by the multi-resonance can be maintained. Consequently, a variable output type electric power supply apparatus of compact, high efficiency and inexpensive can be realized without damaging the characteristics of the multi-resonant type half bridge converter which enables the switching motion with a few electric power loss.

In addition, the variable output type electric power supply apparatus comprising the multi-resonant type half bridge converter in accordance with the present invention is not limited to the above constitutions of the embodiments, and it may comprise at least a transformer, a series circuit of two of first switch elements connected between terminals of a direct current electric power supply, an LC resonant circuit connected between both terminals of one of the first switch elements and a primary winding of the transformer, bidirectional second switch elements connected to secondary windings of the transformer and having rectification function and phase control function, and a control circuit which inputs gate driving signals each having phase differences to the first switch elements and the second switch elements.

In the above constitution, it is preferable that the second switch element has two channels of a forward direction and a reverse direction with respect to an electric current flowing in the secondary winding of the transformer and a first gate and a second gate corresponding thereto; and the control circuit realizes the phase control function by inputting first gate driving signals, having a predetermined phase difference from driving signals inputted into the first switch element, into the channel of the forward direction, and realizes synchronous rectification by inputting second gate driving signals into the channel of the reverse direction.

In addition, it is preferable that the control circuit delays timings of rising edges of the second gate signals with respect to rising edges of the first gate driving signals, and advances falling edges of the second gate driving signals with respect to falling edges of the first gate driving signals.

In addition, it is preferable that the falling edges of the second gate driving signals are earlier than falling edges of driving signals inputted into the first switch elements.

In addition, it is preferable that two of the second switch elements are provided corresponding to the two of the first switch elements, and the control circuit drives the two of the second switch elements alternately corresponding to the two of the first switch elements.

In addition, it is preferable that the second switch element is a switch element having a horizontal transistor structure using GaN/AlGaN.

In addition, it is preferable that the control circuit includes a first gate driving circuit and a second gate driving circuit which are independent from each other and respectively connected to the first gate and the second gate of the second switch element, and the control circuit inputs first driving pulse signals for generating the first gate driving signals into the first gate driving circuit and inputs second driving pulse signals for generating the second gate driving signals having different waveform from the first gate driving signals into the second gate driving circuit.

Alternatively, it is preferable that the control circuit includes a first gate driving circuit and a second gate driving circuit which are independent from each other and respectively connected to the first gate and the second gate of the second switch element, and the control circuit inputs driving pulse signals for generating the first gate driving signals into the first gate driving circuit and inputs the driving pulse signals for generating the second gate driving signals into the second gate driving circuit via a phase adjusting circuit.

Alternatively, it is preferable that the control circuit includes a first gate driving circuit and a second gate driving circuit which are independent from each other and respectively connected to the first gate and the second gate of the second switch element, and the control circuit inputs driving pulse signals for generating the first gate driving signals into the first gate driving circuit and inputs driving electric power into the second gate driving circuit, only, and the second gate driving circuit comprises a voltage detection circuit for detecting a voltage of the first gate driving signals, and generates the second gate driving signals using the driving electric power when the voltage of the first gate driving signals shows a predetermined voltage drop.

Alternatively, it is preferable that the control circuit includes a first gate driving circuit and a second gate driving circuit which are respectively connected to the first gate and the second gate of the second switch element, the first gate driving circuit and the second gate driving circuit are respectively connected to the first gate and the second gate of the second switch element (SIC), the first gate driving circuit and the second gate driving circuit are insulated by transformers, a primary side of the transformer of the first gate driving circuit and a primary side of the transformer of the second gate driving circuit are commonized, the control circuit inputs driving pulse signals for generating the first gate driving signals into the first gate driving circuit, only, the second gate driving circuit comprises a voltage detection circuit for detecting a voltage of the first gate driving signals, and generates the second gate driving signals using an electric power occurred in a secondary side of the transformer when the voltage of the first gate driving signals shows a predetermined voltage drop.

Alternatively, it is preferable that the control circuit includes a snubber circuit connected between terminals of the second switch element, and a first gate driving circuit and a second gate driving circuit which are respectively connected to the first gate and the second gate of the second switch element, the control circuit inputs driving pulse signals for generating the first gate driving signals into an input terminal of the first gate driving circuit, only, the second gate driving circuit, which generates the second gate driving signals using an electric power obtained from the snubber circuit, is connected to the second gate of the second switch element, the second gate driving circuit comprises a voltage detection circuit for detecting a voltage of the first gate driving signals, and generates the second gate driving signals using the electric power obtained from the snubber circuit when the voltage of the first gate driving signals shows a predetermined voltage drop.

Alternatively, it is preferable that a primary winding of a transformer is connected in series with the second switch element, a gate driving circuit 21 (SiC) is connected to the first gate of the second switch element, and a second winding of the transformer is connected to the second gate of the second switch element, and the control circuit inputs drive pulse signals for generating the first gate driving signals into the gate driving circuit, only, and the second gate driving signals are generated directly by electric currents flowing in the transformer.

This application is based on Japan patent application 2010-234517, and the contents thereof should be united with this application referring to the description and the drawings of the above patent application, consequently. In addition, although the present invention is fully described as the embodiments referring to the attached drawings, it is clear to a person of ordinal skill in this art that various changes or modifications are enabled. Therefore, it should be understood that such a change or modification is included in a scope of the present invention not deviating from the scope of the present invention.

The invention claimed is:

1. A variable output type electric power supply apparatus comprising a multi-resonant type half bridge converter, wherein
the multi-resonant type half bridge converter comprises:
a transformer;
a series circuit of two of first switch elements connected between terminals of a direct current electric power supply;
an LC resonant circuit connected between both terminals of one of the first switch elements and a primary winding of the transformer;
bidirectional second switch elements connected to secondary windings of the transformer and having rectification function and phase control function; and
a control circuit which inputs gate driving signals each having phase differences to the first switch elements and the second switch elements, and
outputs from the secondary windings of the transformer are variable,
the second switch elements each has two channels of a forward direction and a reverse direction with respect to an electric current flowing in the secondary winding of the transformer and a first gate and a second gate corresponding thereto; and
the control circuit realizes the phase control function by inputting first gate driving signals, having a predetermined phase difference from driving signals inputted into the first switch element, into the channel of the forward direction, and realizes synchronous rectification by inputting second gate driving signals into the channel of the reverse direction.

2. The electric power supply apparatus in accordance with claim 1, wherein
the control circuit delays timings of rising edges of the second gate signals with respect to rising edges of the first gate driving signals, and advances falling edges of the second gate driving signals with respect to falling edges of the first gate driving signals.

3. The electric power supply apparatus in accordance with claim 1, wherein
two of the second switch elements are provided corresponding to the two of the first switch elements, and the control circuit drives the two of the second switch elements alternately corresponding to the two of the first switch elements.

4. The electric power supply apparatus in accordance with claim 1, wherein
the second switch element is a switch element having a horizontal transistor structure using GaN/AlGaN.

5. The electric power supply apparatus in accordance with claim 1, wherein
the control circuit includes a first gate driving circuit and a second gate driving circuit which are independent from each other and respectively connected to the first gate and the second gate of the second switch element, and
the control circuit inputs first driving pulse signals for generating the first gate driving signals into the first gate driving circuit and inputs second driving pulse signals for generating the second gate driving signals and having a different waveform from the first gate driving signals into the second gate driving circuit.

6. The electric power supply apparatus in accordance with claim 1, wherein
the control circuit includes a first gate driving circuit and a second gate driving circuit which are independent from each other and respectively connected to the first gate and the second gate of the second switch element, and
the control circuit inputs driving pulse signals for generating the first gate driving signals into the first gate driving circuit and inputs the driving pulse signals for generating the second gate driving signals into the second gate driving circuit via a phase adjusting circuit.

7. The electric power supply apparatus in accordance with claim 1, wherein
the control circuit includes a first gate driving circuit and a second gate driving circuit which are independent from each other and respectively connected to the first gate and the second gate of the second switch element,
the control circuit inputs driving pulse signals for generating the first gate driving signals into the first gate driving circuit and inputs driving electric power into the second gate driving circuit, only, and
the second gate driving circuit comprises a voltage detection circuit for detecting a voltage of the first gate driving signals, and generates the second gate driving signals using the driving electric power when the voltage of the first gate driving signals shows a predetermined voltage drop.

8. The electric power supply apparatus in accordance with claim 1, wherein
the control circuit includes a first gate driving circuit and a second gate driving circuit which are respectively connected to the first gate and the second gate of the second switch element,
the first gate driving circuit and the second gate driving circuit are respectively insulated by transformers, and a primary side of the transformer of the first gate driving circuit and a primary side of the transformer of the second gate driving circuit are commonized,
the control circuit inputs driving pulse signals for generating the first gate driving signals into the first gate driving circuit, only, and
the second gate driving circuit comprises a voltage detection circuit for detecting a voltage of the first gate driving signals, and generates the second gate driving signals using an electric power occurred in the secondary side of the transformer when the voltage of the first gate driving signals shows a predetermined voltage drop.

9. The electric power supply apparatus in accordance with claim 1, wherein
the control circuit includes a snubber circuit connected between terminals of the second switch element, and a first gate driving circuit and a second gate driving circuit respectively connected to the first gate and the second gate of the second switch element,
the control circuit inputs driving pulse signals for generating the first gate driving signals into an input terminal of the first gate driving circuit, only,
the second gate driving circuit, which generates the second gate driving signals using an electric power obtained from the snubber circuit, is connected to the second gate of the second switch element, and
the second gate driving circuit comprises a voltage detection circuit for detecting a voltage of the first gate driving signals, and generates the second gate driving signals using the electric power obtained from the snubber circuit when the voltage detection circuit shows a predetermined voltage drop of the voltage of the first gate driving signals.

10. The electric power supply apparatus in accordance with claim 1, wherein
a primary winding of a transformer is connected in series with the second switch element,
a gate driving circuit is connected to the first gate of the second switch element,
a second winding of the transformer is connected to the second gate of the second switch element,
the control circuit inputs drive pulse signals for generating the first gate driving signals into the gate driving circuit, only, and
the second gate driving signals are generated directly by electric currents flowing in the transformer.

11. The electric power supply apparatus in accordance with claim 2, wherein
the falling edges of the second gate driving signals are earlier than falling edges of driving signals inputted into the first switch elements.

* * * * *